(No Model.) 3 Sheets—Sheet 1.

S. R. NYE.
HORSE HAY RAKE.

No. 316,290. Patented Apr. 21, 1885.

WITNESSES:

INVENTOR
S. R. Nye
BY
ATTORNEYS (No Model.) 3 Sheets—Sheet 2.
S. R. NYE.
HORSE HAY RAKE.
No. 316,290. Patented Apr. 21, 1885.
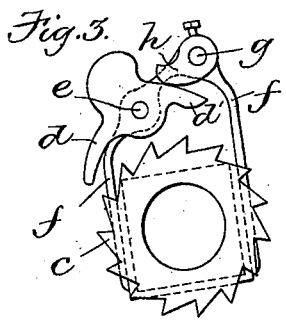
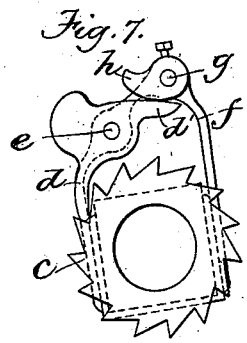
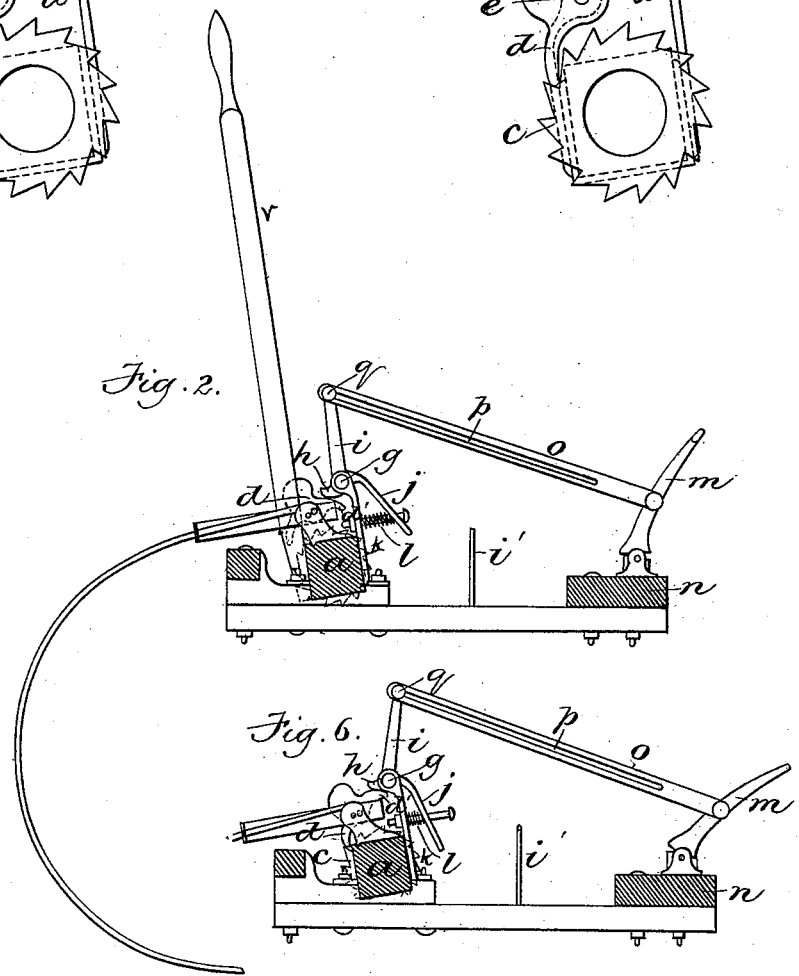
WITNESSES:
INVENTOR
S. R. Nye
BY Might & Brown
ATTORNEYS (No Model.)  3 Sheets—Sheet 3.

S. R. NYE.
HORSE HAY RAKE.

No. 316,290.  Patented Apr. 21, 1885.

WITNESSES:  INVENTOR

UNITED STATES PATENT OFFICE.

SHERMAN R. NYE, OF CHICOPEE FALLS, MASSACHUSETTS.

HORSE HAY-RAKE.

SPECIFICATION forming part of Letters Patent No. 316,290, dated April 21, 1885.

Application filed February 4, 1884. (No model.)

*To all whom it may concern:*

Be it known that I, SHERMAN R. NYE, of Chicopee Falls, in the county of Hampden and State of Massachusetts, have invented certain Improvements in Horse Hay-Rakes, of which the following is a specification.

This invention relates to the class of horse hay-rakes shown in Letters Patent of the United States granted to me July 29, 1879, No. 217,897, in which the wheels are provided with ratchets, and the rake head or axle is provided, first, with gravitating dogs adapted to engage automatically with said ratchets, and thus cause the rotation of the wheels to dump the load, and, secondly, with means whereby the dogs are normally held away from the ratchets, and are released by the driver and allowed to engage with the ratchets when the load is to be dumped, and are automatically separated from the ratchets to release the rake-head and allow the teeth to drop on the completion of the dumping operation.

The object of my present invention is to provide improved means for operating the gravitating dogs; and to this end it consists in the improvements which I will now proceed to describe.

Figure 1:
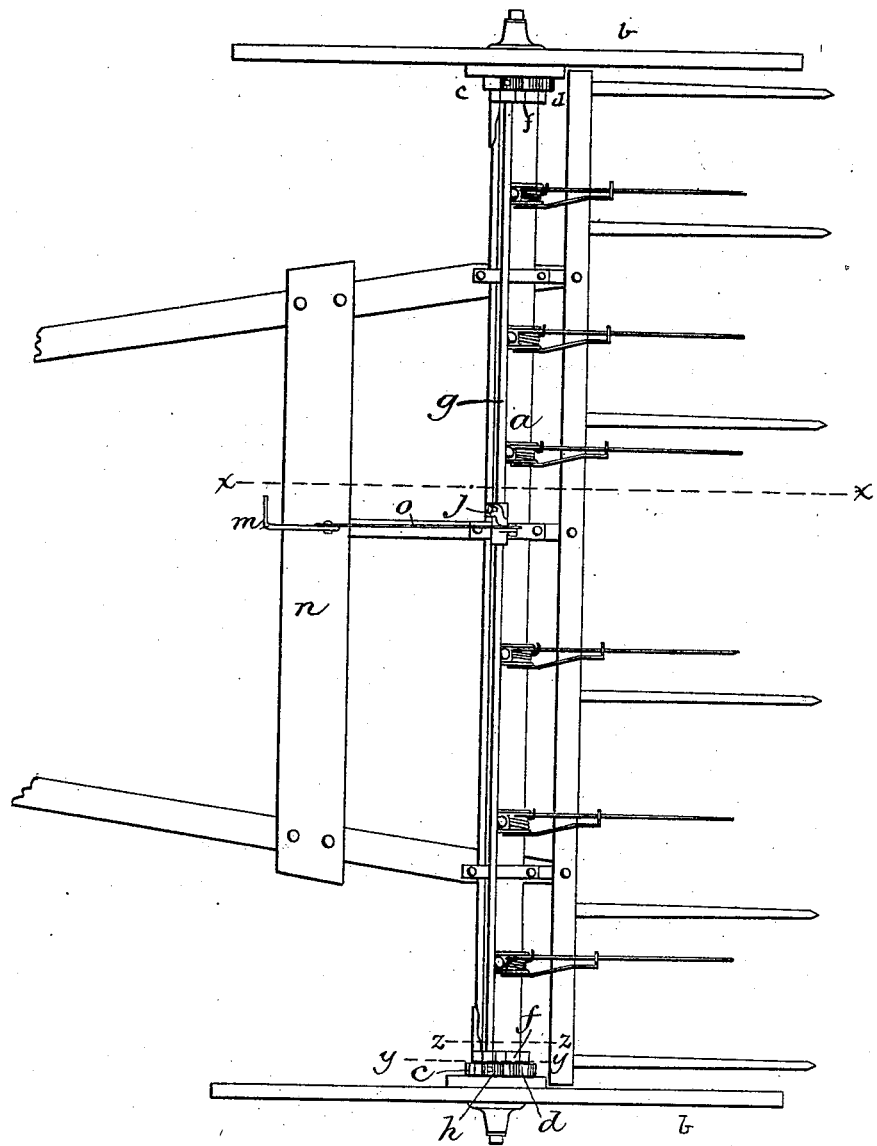
Figure 5:
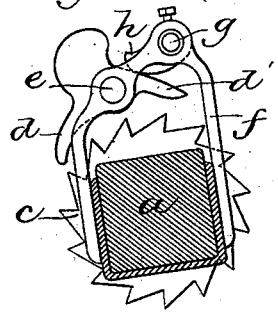
Figure 4:
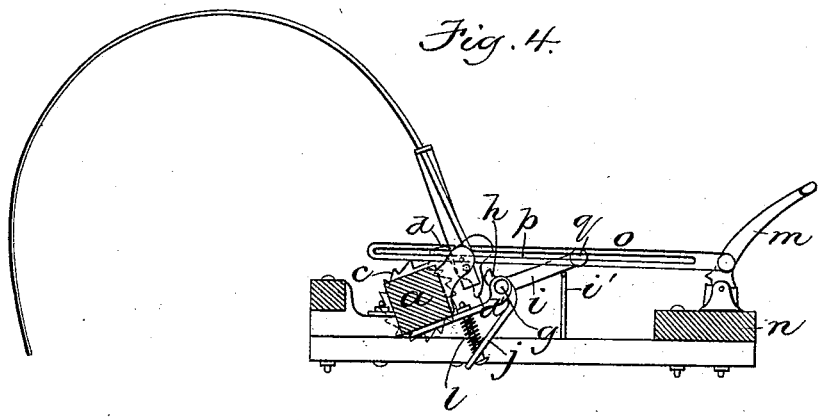

Of the accompanying drawings, forming a part of this specification, Figure 1 represents a top view of a rake provided with my improvements. Figs. 2 and 3 represent, respectively, sections on lines $x\,x$ and $y\,y$, Fig. 1, showing the rake head or axle in the positions it occupies when the teeth are raking. Figs. 4 and 5 represent, respectively, sections on lines $x\,x$ and $y\,y$, Fig. 1, showing the rake head or axle in the position it occupies when the teeth are raised to dump the load. Fig. 6 represents a section on line $x\,x$, Fig. 1, showing the rake head or axle in the same position as in Figs. 2 and 3, and the rock-shaft turned to permit the dogs to engage with the ratchets. Fig. 7 is a detail of the ratchet mechanism.

The same letters of reference indicate the same parts in all the figures.

In the drawings, $a$ represents the rake head or axle. $b\,b$ represent the wheels, to the axles of which are rigidly affixed the ratchets $c\,c$.

$d\,d$ represent the gravitating dogs, which are pivoted at $e$ to yokes $f\,f$, attached to the axle near its ends, and are adapted to engage by gravitation with the ratchets. The dogs $d$ are provided with forwardly-projecting arms $d'$.

$g$ represents a rod or rock-shaft journaled in the yokes $f\,f$, and provided at its ends with cams $h\,h$, arranged over and bearing upon the arms $d'$ of the dogs $d$. When the rock-shaft is turned to elevate its cams, as shown in Fig. 6, the dogs $d$ are permitted to drop and engage with the ratchets; but when the rock-shaft is turned to depress its cams, as shown in Figs. 2 and 3, the dogs are raised by the bearing of the cams on the arms $d'$, and are thus held out of engagement with the ratchets.

To the rock-shaft, at about the middle of its length, is rigidly affixed an upwardly-projecting lever, $i$, and a downwardly-projecting lever, $j$.

Between the downwardly-projecting lever $j$ and the front side of a standard, $k$, supporting the middle of the rock-shaft, is interposed a spring, $l$, which presses the lever $j$ away from the rake head or axle, and thus normally holds the rock-shaft in the position shown in Figs. 2 and 3, the cams holding the dogs away from the ratchets.

$m$ represents a treadle pivoted to the foot-board or cross-bar $n$, affixed to the thills of the rake. Said treadle is connected with the upwardly-projecting lever $i$ on the rock-shaft by a link, $o$, which is pivoted to the treadle, and is provided with a longitudinal slot, $p$, which receives a pin or stud, $q$, on the rock-shaft lever $i$, said pin bearing against the rear end of the slot $p$ when the rake-head is in the position shown in Figs. 1 and 2.

When the driver desires to dump the load gathered by the rake-teeth, he presses the treadle forward, and thereby, through the link $o$ and lever $i$, turns the rock-shaft from the position shown in Figs. 2 and 3 to that shown in Figs. 6 and 7, thus allowing the dogs to engage with the ratchets. This engagement causes the rake head or axle to rotate with the wheels until the rake-teeth are raised to the desired height, when the lever $i$ of the rock-shaft $g$ strikes a stud or arm, $i'$, on a bar extending backwardly from the cross-bar $n$. The contact of the lever $i$ with the stud $i'$ turns the rock-shaft sufficiently to cause the cams to disengage the dogs $d$ from the ratchets, whereupon the spring $l$ additionally turns the rock-shaft in the same direction until the dogs are thrown out to their normal inoperative position. (Shown in Figs. 4 and 5.) The rake head or axle of course turns backwardly as soon as the dogs are disengaged from the ratchets.

The rock-shaft and its cams act on the arms or levers on the dogs at a considerable distance from the pivots of said dogs, and therefore disengage the dogs with much less expenditure of power than the rod or rock-shaft shown in my former patent, said rod having arms provided with lifting devices bearing against the under sides of the dogs near their pivots, and therefore requiring so much power to lift the dogs that the strain was liable to displace the lifting devices, and thus prevent them from operating properly and necessitating loss of valuable time for repairs. This liability is entirely obviated by my improved devices.

The slot $p$ in the connecting-link $o$ enables the lever $i$ of the rock-shaft to move forward independently of the link when the rake-head is being rotated, the stud $q$ on said lever sliding in the slot $p$, the link having no endwise movement. The link therefore cannot be operated to again engage the dogs with the ratchets until the rake has resumed its operative position; hence the operator is given ample time in which to remove his foot from the treadle. If the connection between the treadle and the rock-shaft lever were constantly operative, the operator would be obliged to release the treadle before the dogs are disengaged from the ratchets by the forward rotation of the rake-head; otherwise the pressure on the treadle would cause the re-engagement of the dogs with the treadles while the rake-head is falling back.

The hand dumping-lever $v$ forms no part of the present invention.

I claim—

1. The combination of ratchets secured to the wheels, the dogs pivoted to the rake head or axle and having forwardly-projecting arms, a rock-shaft having cam-projections placed above said arms, and a spring operating the rock-shaft to hold the dogs out of engagement by means of the cams bearing thereon, as set forth.

2. The combination of the ratchets secured to the wheels, the dogs pivoted to the rake head or axle and having forwardly-projecting arms, the rock-shaft having cams projecting above said dogs, a spring whereby the shaft is rocked and its cams thrown into engagement with the dogs, and automatic tripping mechanism, substantially as described, whereby the dogs are disengaged, as set forth.

3. The combination of the ratchets secured to the wheels, the automatic dogs pivoted to the rake head or axle and having arms or levers, the rock shaft or rod having cams adapted to act on said arms, a treadle, and a slotted link leading therefrom and connected to an arm or lever on the rock-shaft, whereby the rock-shaft may be turned to cause its cams to release the dogs, as set forth.

4. The combination of the ratchets secured to the wheels, the automatic dogs $d$, pivoted to the rake head or axle, and having arms or levers $d'$, the rock-shaft having cams $h$ and a central lever, $i$, the pivoted treadle $m$, and the slotted connecting-link $o$, pivoted to the treadle and connected to the lever of the rock-shaft by a stud adapted to slide in the slot of said link when the rake head or axle is rotated to dump the load, substantially as and for the purposes specified.

In testimony whereof I have signed my name to this specification, in the presence of two subscribing witnesses, this 26th day of January, 1884.

SHERMAN R. NYE.

Witnesses:
WM. C. TAYLOR,
ANDREW GALE.